United States Patent
Appelo

(10) Patent No.: US 8,906,333 B1
(45) Date of Patent: Dec. 9, 2014

(54) DRY SCRUBBER SYSTEM WITH AIR PREHEATER PROTECTION

(71) Applicant: ALSTOM Technology Ltd, Baden (CH)

(72) Inventor: Per-Erik Albert Appelo, Knoxville, TN (US)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 14/091,467

(22) Filed: Nov. 27, 2013

(51) Int. Cl.
*B01D 53/50* (2006.01)
*B01D 53/81* (2006.01)

(52) U.S. Cl.
CPC .................................... *B01D 53/508* (2013.01)
USPC ................. 423/244.01; 423/244.07; 422/168; 422/169

(58) Field of Classification Search
USPC ................. 423/244.01, 244.07; 422/168, 169
See application file for complete search history.

(56) References Cited

U.S. PATENT DOCUMENTS

| | | | |
|---|---|---|---|
| 3,932,588 A * | 1/1976 | Libutti et al. | 423/244.01 |
| 4,610,849 A | 9/1986 | Van Camp et al. | |
| 5,165,903 A * | 11/1992 | Hunt et al. | 423/239.1 |
| 6,391,266 B1 * | 5/2002 | Lavely, Jr. | 422/172 |
| 7,332,143 B2 * | 2/2008 | Symrniotis et al. | 423/239.1 |
| 7,488,461 B2 * | 2/2009 | Nagayasu et al. | 423/210 |
| 7,833,501 B2 * | 11/2010 | Kobayashi et al. | 423/210 |
| 7,854,911 B2 * | 12/2010 | Maziuk, Jr. | 423/243.01 |

FOREIGN PATENT DOCUMENTS

| | | |
|---|---|---|
| CA | 2541973 | 4/2004 |
| WO | WO 97/37747 | 10/1997 |

* cited by examiner

*Primary Examiner* — Timothy Vanoy
(74) *Attorney, Agent, or Firm* — Rita D. Vacca

(57) ABSTRACT

An air quality control system (AQCS) useful for treating flue gas, such as flue gas produced by a fossil fuel fired boiler, is described. In addition to flue gas treatment, the AQCS provides for air preheater flue gas outlet flue gas temperature reduction and air preheater corrosion prevention while reducing capital costs, increasing reliability and increasing operating flexibility with regard to fuel selection.

15 Claims, 1 Drawing Sheet

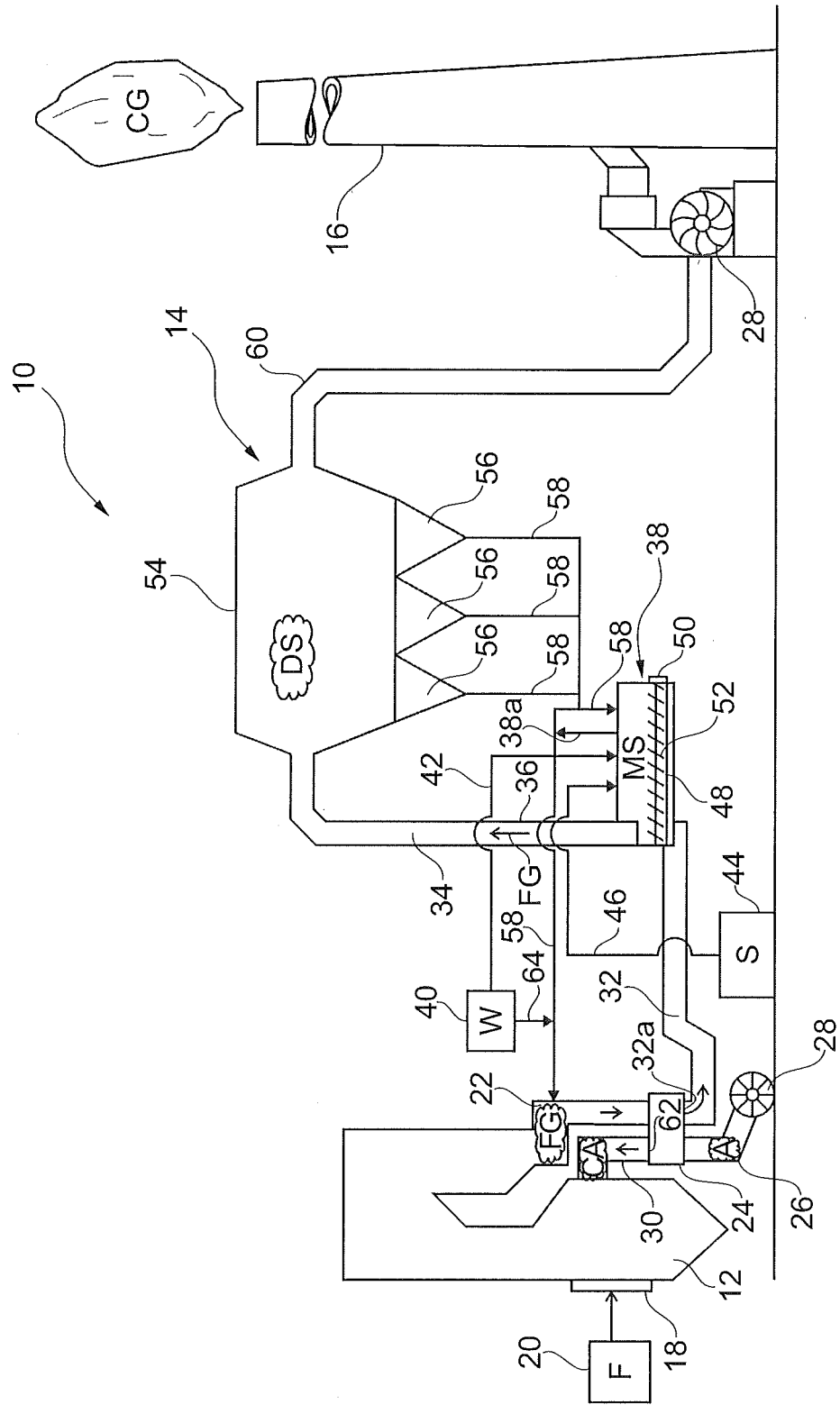

DRY SCRUBBER SYSTEM WITH AIR PREHEATER PROTECTION

TECHNICAL FIELD

The present disclosure is generally directed to a dry scrubber or reactor useful for processing a gas stream, such as a flue gas stream emitted from a fossil fuel fired boiler, a combustion process, or the like. More particularly, the present disclosure is directed to a circulating dry scrubber (CDS) dry flue gas desulfurization (DFGD) system operable using a moistened sorbent supply to process a flue gas stream while protecting an associated air preheater from corrosion.

BACKGROUND

In the processing or treatment of flue gas or gas streams, dry flue gas desulfurization (DFGD) systems are known. In DFGD system processes, lime (CaO) is first converted to hydrated lime ($Ca(OH)_2$) before contact with the flue gas. The hydrated lime contacts the flue gas as a dry or moistened powder in a circulating dry scrubber (CDS) DFGD system. An example of such a CDS DFGD system is the ALSTOM NID™ system (ALSTOM Power Inc., Paris, France) (NID).

U.S. Pat. No. 4,610,849, invented by John Van Camp et al., discloses a spray dryer absorber (SDA) DFGD system that uses an aqueous slurry containing an alkaline reagent for reaction with sulfur oxides in a flue gas. This SDA DFGD system uses an array of spaced apart nozzles adapted to introduce a plurality of spray patterns into a reaction zone. The spaced apart nozzles introduce the aqueous slurry containing an alkaline reagent into the reaction zone for contact with the flue gas for reaction of the alkaline reagent and the sulfur oxides in the flue gas.

WO 97/37747, invented by Stefan Ahman et al., discloses a device for a CDS DFGD system useful for discharging and distributing an absorbent material in a flue gas duct. Accordingly, in a vertical flue gas duct for flue gases containing gaseous pollutants, a discharging and distributing device is arranged to discharge and distribute a particulate absorbent material reactive with the gaseous pollutants in the flue gas to convert the gaseous pollutants to a separable dust.

While methods and equipment capable of removing both particulate and gaseous pollutants from a flue gas stream exist, there remains a need for improved DFGD methods and equipment that also protect associated system air preheaters from pollutant corrosion while maintaining efficiency and effectiveness.

SUMMARY

The present invention provides an air quality control system (AQCS) comprising an ALSTOM NID™ system (NID) dry flue gas desulfurization (DFGD) system operable using a moistened powder sorbent, such as calcium oxide or calcium hydroxide. The subject AQCS system uses a NID DFGD system in combination with a fabric filter module (FF) to treat flue gas for the removal of sulfur dioxide, and like particulate and gaseous pollutants therefrom. The use of moistened powder calcium oxide or calcium hydroxide is desirable due to lower capital investment requirements and lower associated operating costs as compared to wet flue gas desulfurization (WFGD) systems or spray dryer absorber (SDA) DFGD systems that operate using an aqueous lime slurry. While the present disclosure is directed to DFGD using a NID system in combination with a FF, the teachings of the present disclosure are equally applicable to other DFGD systems, such as SDA systems with a FF, SDA systems with an electrostatic precipitator (ESP), CDS systems with an ESP, CDS systems with a FF, and NID systems with an ESP. However, for purposes of clarity and simplicity, the present disclosure is directed to an exemplary embodiment of a NID DFGD system with a FF that provides protection for an associated air preheater from corrosion while maintaining system efficiency and effectiveness.

The AQCS of the present disclosure comprises gas ductwork through which flue gas from a combustion process within a boiler flows for treatment prior to release to the atmosphere via a stack. Arranged in the gas ductwork is an inlet to a NID DFGD system. The NID DFGD system comprises a DFGD scrubber or reactor equipped with a distribution device fluidly connected to a sorbent supply and a water supply. The sorbent supply may be in the form of a tank, silo, mixer or other suitable container for sorbent storage and/or supply. Such may also be true of the water supply. Fluidly connected to the DFGD reactor is a FF for removal of particulate matter to produce cleaned flue gas CG prior to its release to the atmosphere through a stack. As noted above, an ESP may be used in the place of the FF for removal of particulate matter to produce cleaned flue gas CG prior to its release to the atmosphere through a stack. Using the subject AQCS equipped with a NID DFGD system and a FF module, dirty flue gas laden with particulate and/or gaseous pollutants, such as for example, $SO_2$, $SO_3$, HCl, HF, fly ash particulates and/or like acidic contaminants, enters the AQCS through an inlet for treatment/cleaning. As the flue gas passes through the inlet into the DFGD reactor, a moistened sorbent from a sorbent supply is uniformly dispersed across a horizontal cross section of the DFGD reactor through which the flue gas flows. The moistened sorbent reacts with the flue gas acidic gases, i.e., $SO_2$, HCl, $SO_3$ and/or HF, and the reacted sorbent is dried by the flue gas to create a dry particulate by-product. The dry particulate by-product is then captured within the FF module or like particulate removal device of the AQCS. A portion of the captured dry particulate by-product collected in fluidly connected hoppers is transported to the distribution device for redistribution within the DFGD reactor. Cleaned flue gas CG flows from the FF module through a fluidly connected gas duct to a fluidly connected stack for cleaned flue gas CG release to the atmosphere.

Like most traditional FF modules, the present AQCS uses a FF module sectioned into multiple integrated components. By having multiple integrated components, an operator may isolate one or more individual integrated components for maintenance while keeping the remaining integrated components in operation. Likewise, one or more individual integrated components may undergo "turn down" during periods of low demand/low gas flow/low contaminant output, so as to limit or avoid excess equipment wear, excess energy consumption and excess operational costs associated therewith.

For overall power plant efficiency, an air preheater is used in conjunction with the boiler reducing flue gas temperature at the air preheater flue gas outlet. However, in the case of boilers combusting fuel of a relatively high sulfur content, reduced flue gas temperature at the air preheater flue gas outlet causes $SO_3$ to condensate. Such condensation of $SO_3$ in the air preheater either prematurely corrodes the air preheater or requires the use of more expensive air preheater heat transfer element baskets, such as enamel baskets, to protect the same from corrosion. To protect the air preheater from corrosion without the use of more expensive components at significant added expense, the subject AQCS injects dried and/or moistened sorbent into the flue gas stream upstream with regard to the flow of flue gas through the AQCS, of the air preheater. As such, the injected dried and/or moistened sorbent reacts with the $SO_3$ condensate within the air preheater to thus protect the air preheater from premature corrosion without significant added expense. Additionally, $SO_3$ in the flue gas upstream of the air preheater may condensate on the dried or moistened sorbent injected therein. Such $SO_3$ condensation on the injected sorbent also protects the air preheater from corrosion. The subject AQCS as described in greater detail below uses a moistened sorbent in a NID DFGD reactor with a FF module to treat flue gas, to reduce air preheater flue gas outlet flue gas temperature for system efficiency, and to prevent air preheater premature corrosion while reducing capital costs, increasing reliability and increasing operating flexibility with regard to fuel selection.

In summary, the present disclosure provides an AQCS for treating flue gas produced in a combustion process to produce cleaned flue gas CG, that comprises a combustion boiler equipped with an air preheater arranged for flue gas flow from the boiler through a duct and into the air preheater. The system likewise includes ductwork for flue gas flow from an air preheater flue gas outlet to a NID DFGD reactor equipped with a distribution device. Flue gas flowing from the air preheater flue gas outlet is of a reduced temperature for increased boiler efficiency. A sorbent supply is operable to supply sorbent to the distribution device of the NID DFGD reactor. A water supply is operable to supply water to the distribution device for mixing with the sorbent therein to produce a moistened sorbent for distribution within the NID DFGD reactor. Following contact of the flue gas with the moistened sorbent in the reactor, a particulate removal device is operable to remove reacted dried sorbent from the flue gas to produce cleaned flue gas CG separated from the reacted dried sorbent. The produced cleaned flue gas CG is then released via a stack to the environment. A portion of the reacted dried sorbent from the particulate removal device is supplied to the distribution device and/or the flue gas duct upstream of the air preheater. Alternatively, or in addition thereto, a portion of the moistened sorbent from the distribution device is supplied to the flue gas duct upstream of the air preheater. Optionally, water from the water supply may be added to the dried sorbent and/or moistened sorbent supplied to the flue gas duct upstream of the air preheater for moistening of the sorbent.

The subject AQCS is a NID system, a CDS system or an SDA system using calcium oxide, calcium hydroxide or a combination thereof as the preferred sorbent. After mixing the sorbent with water in the distribution device, the resultant moistened sorbent has a water content of approximately 1 percent to approximately 6 percent, or approximately 3 percent. Advantageously, injection of dried sorbent and/or moistened sorbent in the flue gas duct between the boiler and the air preheater prevents premature corrosion of the air preheater by sorbent reaction with $SO_3$ and like acid gases in the flue gas flowing through the flue gas duct to the air preheater. Following contact of the dried sorbent and/or moistened sorbent with the flue gas, a particulate collection device such as a fabric filter module or an electrostatic precipitator is used to separate and collect the resultant dried sorbent from the cleaned flue gas.

A method of treating combustion process flue gas to produce cleaned flue gas CG and to reduce system corrosion comprises arranging a combustion boiler equipped with an air preheater for flue gas flow from the boiler through a duct and into the air preheater, and arranging ductwork for flue gas flow from the air preheater to a NID DFGD reactor equipped with a distribution device. The subject method also includes providing a sorbent supply operable to supply a sorbent to the distribution device of the NID DFGD reactor, and providing a water supply operable to supply water to the distribution device for mixing with the sorbent therein to produce a moistened sorbent for distribution within the NID DFGD reactor for flue gas contact. A particulate removal device is operable to remove reacted dried sorbent from the flue gas following contact of the flue gas with the moistened sorbent in the NID DFGD reactor, to produce cleaned flue gas CG separated from the reacted dried sorbent. A portion of the reacted dried sorbent from the particulate removal device is supplied to the distribution device and/or the flue gas duct upstream of the air preheater. Alternatively, or in addition thereto, a portion of the moistened sorbent from the distribution device is supplied to the flue gas duct upstream of the air preheater. Optionally, water from the water supply may be added to the dried sorbent and/or moistened sorbent supplied to the flue gas duct upstream of the air preheater for moistening of the sorbent prior to injection thereof into the flue gas stream in the flue gas duct.

According to the subject method, the combustion flue gas is treated to produce cleaned flue gas CG using a NID system, a CDS system or an SDA system. The sorbent used in this method is calcium oxide, calcium hydroxide or a combination thereof. Preferably, the moistened sorbent used in the method has a water content of approximately 1 percent to approximately 6 percent, or approximately 3 percent. The distribution of dried sorbent and/or moistened sorbent to the flue gas duct upstream of the air preheater prevents premature corrosion of the air preheater by sorbent contact and reaction with $SO_3$ and like acid gases in the flue gas flowing through the duct. The particulate collection device used to separate the reacted dried sorbent from the cleaned flue gas CG may be either a fabric filter module or an electrostatic precipitator.

Additional features of the present air preheater protective air quality control system will be apparent from the following description from which the subject exemplary embodiment is set forth in detail in conjunction with the accompanying drawings.

BRIEF DESCRIPTION OF THE DRAWINGS

The subject air preheater protective air quality control system is disclosed in more detail below with reference to the appended drawings wherein:

FIG. 1 is a schematic view of a plant with the subject air preheater protective an air quality control system for treating/cleaning flue gas from a combustion process.

DETAILED DESCRIPTION

A plant 10 in accordance with the subject disclosure as illustrated in FIG. 1, includes a boiler 12, an air quality control system (AQCS) 14 and a stack 16. It is noted that many additional and varied process steps using additional equipment may take place or be arranged between boiler 12 and AQCS 14, as is known to those skilled in the art. Likewise, many additional and varied process steps using additional equipment may take place or be arranged between AQCS 14 and stack 16, as is known to those skilled in the art. Such additional process steps and/or equipment are not described in further detail herein for purposes of clarity and simplicity.

As noted previously, FIG. 1 illustrates schematically a plant 10 with an AQCS 14 for cleaning dirty flue gas, FG, produced by a boiler 12 operative for fuel F combustion therein. As such, fuel F is supplied to boiler 12 through fuel inlet 18 from a fluidly connected fuel source 20. Fuel F may be coal, natural gas, or other like fossil fuel. Hot flue gas FG produced by the combustion of fuel F in boiler 12 contains $SO_2$, $SO_3$, HCl, HF, fly ash particulates and/or like acidic pollutants. The hot flue gas FG flows from boiler 12 through a fluidly connected gas duct 22 fluidly connected to an air preheater 24. Air preheater 24 is used to transfer heat from the hot flue gas FG to air A supplied through a fluidly connected duct 26 from a fluidly connected fan 28. Air A supplied to the air preheater 24 is heated by the hot flue gas FG prior to flow from the air preheater 24 through a fluidly connected duct 30 and into the fluidly connected boiler 12 as combustion air CA. Optionally, a portion of combustion air CA produced by the air preheater 24 may be diverted and used for purposes other than combustion according to plant 10 needs. Likewise, one or more fans 28 may be used in the plant 10 for transport of flue gas FG from the boiler 12 through to stack 16.

From air preheater 24, flue gas FG of a reduced temperature from that of gas duct 22, flows through a fluidly connected gas duct 32. Gas duct 32 has a vertical portion 34 comprising a NID DFGD scrubber or reactor 36. In reactor 36 within vertical portion 34 is a distribution device 38. Distribution device 38 introduces, in a manner such as that disclosed in WO 96/16727, a moistened sorbent such as calcium oxide and/or calcium hydroxide into the flue gas FG flowing through reactor 36. For this purpose, water W from a water supply 40 flows through a fluidly connected pipe 42 to fluidly connected distribution device 38. Likewise, sorbent S from a sorbent supply 44 is supplied through a fluidly connected duct 46 to fluidly connected distribution device 38.

Distribution device 38 comprises a container 48 essentially in the shape of an elongated box. Container 48 comprises a motor 50 and a mixer 52 for mixing together water W and sorbent S supplied thereto from water supply 40 and sorbent supply 44 to produce moistened sorbent MS having a water content of approximately 1 percent to approximately 6 percent, or approximately 3 percent. Moistened sorbent MS is uniformly distributed by the distribution device 38 into the fluidly connected reactor 36 in vertical portion 34 of gas duct 32. As such, moistened sorbent MS may be continuously introduced into reactor 36 for uniform distribution and intermixing contact with the flue gas FG flowing therethrough. After intermixing contact with the flue gas FG, the resultant reacted dried sorbent DS entrained by the flue gas FG enters a fluidly connected fabric filter FF module 54. Particulate matter including reacted dried sorbent DS, hereinafter referred to collectively as "dried sorbent DS", is collected in hoppers 56 of FF module 54. A portion of the dried sorbent DS is transported from hoppers 56 through fluidly connected ducts 58 to fluidly connected container 48 for mixture with the moistened sorbent MS therein, and/or to fluidly connected flue gas duct 22 upstream of the air preheater 24. Alternatively, or in addition thereto, a portion of the moistened sorbent MS from the distribution device 38 is supplied through fluidly connected ducts 38a and 58 fluidly connected to flue gas duct 22 upstream of the air preheater 24. Optionally, water W from the water supply 40 may be added via fluidly connected pipe 64 to the dried sorbent DS and/or moistened sorbent MS supplied to the flue gas duct 22 upstream of the air preheater 24 for moistening of the sorbent prior to injection thereof into the flue gas FG stream in the flue gas duct 22. Likewise, a portion of dried sorbent DS collected in hoppers 56 may be transported elsewhere for other purposes or discarded. Cleaned flue gases CG exit FF module 54 via fluidly connected duct 60 for release to the atmosphere via fluidly connected stack 16.

For plant 10 efficiency, flue gas FG flowing from air preheater 24 flue gas outlet 32a is of a reduced temperature from that of flue gas FG flowing through gas duct 22. For example, flue gas FG flowing from air preheater 24 is of a reduced temperature of approximately 80° C. to approximately 150° C. Plant 10 efficiency is improved using flue gas FG heat energy in the air preheater 24 to heat air A used as combustion air CA in boiler 12 thereby increasing boiler 12 output. However, in the case of boilers 12 combusting fuel F of a relatively high sulfur content, flue gas FG having an air preheater 24 flue gas outlet 32a reduced temperature causes $SO_3$ to condensate in the air preheater 24. Such condensation of $SO_3$ in the air preheater 24 either prematurely corrodes the air preheater 24 or requires the use of more expensive air preheater 24 components, such as enamel components, to protect the same from corrosion. To protect the air preheater 24 from corrosion without the use of more expensive components at significant added expense, the subject AQCS 14 distributes dried sorbent and/or moistened sorbent into the flue gas FG in flue gas duct 22 upstream, with respect to the flow of flue gas FG through the AQCS 14, of the air preheater 24. As such, the uniformly distributed dried and/or moistened sorbent injected into flue gas FG in flue gas duct 22 reacts with $SO_3$ and like acidic condensate in the air preheater 24 to thus protect the air preheater 24 from premature corrosion without significant added expense. Also, the injected distributed dried sorbent and/or moistened sorbent allows for $SO_3$ condensation onto the injected dried sorbent and/or moistened sorbent upstream of the air preheater 24 for protection of the preheater 24. Accordingly, dried sorbent DS from hoppers 56 and/or moist sorbent MS from distribution device 38 is transported through fluidly connected duct 58 and/or through fluidly connected ducts 38a and 58 to fluidly connected gas duct 22. Likewise, water W from water supply 40 is optionally transported through fluidly connected pipe 64 to fluidly connected duct 58 for mixture with dried sorbent DS and/or moistened sorbent MS for injection in flue gas duct 22 for uniform distribution thereof up stream of air preheater 24. Dried sorbent DS and/or moistened sorbent MS distributed in flue gas duct 22 upstream of air preheater 24 reacts with $SO_3$ and like acidic pollutants in the hot flue gas FG producing reacted dried sorbent DR. The subject AQCS 14 as disclosed herein uses a moistened sorbent MS in a NID DFGD system with a FF module to treat flue gas FG, to enable air preheater 24 flue gas outlet 32a flue gas FG temperature reduction, and to prevent air preheater 24 premature corrosion while reducing capital costs associated with enamel components or the like, increasing reliability due to reduced equipment corrosion, and increasing operating flexibility based on increased fuel selection flexibility.

In summary, the present disclosure provides an air quality control system (AQCS) 14 for treating flue gas FG produced in a combustion process to produce cleaned flue gas CG, that comprises a combustion boiler 12 equipped with an air preheater 24 arranged for flue gas FG flow from the boiler 12 through a flue gas duct 22 and into the air preheater 24 for reduced flue gas FG temperature at flue gas outlet 32a. The system likewise includes a fluidly connected duct 32 for flue gas FG flow from the air preheater 24 to a NID DFGD reactor 36 equipped with a distribution device 38. A sorbent supply 44 is operable to supply sorbent S to the distribution device 38 of the NID DFGD reactor 36. A water supply 40 is operable to supply water W to the distribution device 38 for mixing with the sorbent S therein to produce a moistened sorbent MS for distribution of the moistened sorbent MS in the NID DFGD reactor 36. A particulate removal device 54 is operable to remove reacted dried sorbent DS from the flue gas FG following contact of the flue gas FG with the moistened sorbent MS in the NID DFGD reactor 36, to produce cleaned flue gas CG separated from dried sorbent DS. The produced cleaned flue gas CG is then released via a stack 16 to the environment. Furthermore, dried sorbent DS from hoppers 56 and/or moist sorbent MS from distribution device 38 is transported through fluidly connected duct 58 and/or through fluidly connected ducts 38a and 58, respectively, to fluidly connected gas duct 22. Likewise, water W from water supply 40 is optionally transported through fluidly connected pipe 64 to fluidly connected duct 58 for mixture with dried sorbent DS and/or moistened sorbent MS for injection in flue gas duct 22 for uniform distribution thereof up stream of air preheater 24. Dried sorbent DS and/or moistened sorbent MS distributed in flue gas duct 22 upstream of air preheater 24 reacts with $SO_3$ and like acidic pollutants in the hot flue gas FG producing reacted dried sorbent DR. Also, the injected distributed dried sorbent DS and/or moistened sorbent MS allows for $SO_3$ condensation onto the injected dried sorbent DS and/or moistened sorbent MS upstream of the air preheater 24 for protection of the preheater 24.

The subject AQCS is a NID system, a CDS system or an SDA system using calcium oxide, calcium hydroxide or a combination thereof as the preferred sorbent. After mixing the sorbent with water, the resultant moistened sorbent has a water content of approximately 1 percent to approximately 6 percent, or approximately 3 percent. Advantageously, distribution of the moistened sorbent MS and/or dried sorbent DS in flue gas duct 22 between the boiler 12 and the air preheater 24 prevents premature corrosion of the air preheater 24 by reacting with $SO_3$ and like acid gases in the flue gas FG flowing through the flue gas duct 22. Following contact of and mixing with the dried sorbent DS and/or moistened sorbent MS in flue gas duct 22, the flue gas FG flows through NID DFGD reactor 36 to a particulate collection device 54 such as a fabric filter module or an electrostatic precipitator, for dried sorbent DS collection.

A method of treating combustion process flue gas FG to produce cleaned flue gas CG and to reduce system corrosion comprises arranging a combustion boiler 12 equipped with an air preheater 24 for flue gas FG flow from the boiler 12 through a flue gas duct 22 and into the air preheater 24. Flue gas FG flowing from flue gas outlet 32a into fluidly connected duct 32 is of a reduced temperature from that of flue gas FG flowing through flue gas duct 22. From duct 32, flue gas FG flows to a fluidly connected NID DFGD reactor 36 equipped with a distribution device 38. The subject method also includes providing a sorbent supply 44 operable to supply sorbent S to the distribution device 38 of the NID DFGD reactor 36, and providing a water supply 40 operable to supply water W to the distribution device 38 for mixing with the sorbent S therein to produce a moistened sorbent MS for distribution in the NID DFGD reactor 36. Following the NID DFGD reactor 36, a particulate removal device 54 operable to remove dried sorbent DS from the flue gas FG following contact of and mixing with the flue gas FG in the NID DFGD reactor 36, is used to produce cleaned flue gas CG by separating the dried sorbent DS therefrom.

According to the subject method, the combustion flue gas FG is treated to produce cleaned flue gas CG using a NID system, a CDS system or an SDA system. The sorbent S used in this method is calcium oxide, calcium hydroxide or a combination thereof. Preferably, moistened sorbent MS used in the method has a water content of approximately 1 percent to approximately 6 percent, or approximately 3 percent. The distribution of dried sorbent DS and/or such moistened sorbent MS to flue gas duct 22 prevents premature corrosion of the air preheater 24 by reaction with $SO_3$ and acid gases in the flue gas FG flowing through the flue gas duct 22. The particulate collection device 54 used to separate resultant dried sorbent DS from the cleaned flue gas CG following the NID DFGD reactor 36, may be either a fabric filter module or an electrostatic precipitator.

Various system embodiments and methods have been described herein. The descriptions are intended to be illustrative. It will be apparent to one of skill in the art that modifications may be made to the embodiments as described without departing from the scope of the claims set forth below. For example, it is to be understood that although some of the embodiments have been described in the context of an AQCS of a particular arrangement, it should be appreciated that other arrangements may be used without deviation from the spirit and scope of the claims below.

The invention claimed is:

1. An air quality control system for treating flue gas produced in a combustion process to produce cleaned flue gas comprising:
   a combustion boiler equipped with an air preheater arranged for flue gas flow from the boiler through a duct and into the air preheater;
   ductwork for flue gas of a reduced temperature flow from the air preheater to a dry flue gas desulfurization reactor equipped with a distribution device;
   a sorbent supply operable to supply a sorbent to the distribution device of the dry flue gas desulfurization reactor;
   a water supply operable to supply water to the distribution device for mixing with the sorbent therein to produce a moistened sorbent for distribution in the dry flue gas desulfurization reactor;
   a particulate removal device operable to remove dried sorbent from flue gas following contact of the flue gas in the dry flue gas desulfurization reactor to produce cleaned flue gas; and
   a duct for transport of dried sorbent from the particulate removal device or optionally transport of moistened sorbent from the distribution device for injection of the sorbent into the duct arranged between the boiler and the air preheater for reaction with flue gas $SO_3$ and acid gases.

2. The system of claim 1, wherein the cleaned flue gas is released via a stack to the environment.

3. The system of claim 1, wherein the sorbent is calcium oxide, calcium hydroxide or a combination thereof.

4. The system of claim 1, wherein sorbent injected into the duct arranged between the boiler and the air preheater is moistened with water from the water supply.

5. The system of claim 1, wherein the distribution of dried sorbent or moistened sorbent to the duct prevents premature corrosion of the air preheater.

6. The system of claim 1, wherein the particulate collection device is a fabric filter module or an electrostatic precipitator.

7. The system of claim 1 wherein the dry flue gas desulfurization system is a NID system, a CDS system or an SDA system.

8. The system of claim 1, wherein SO3 in the flue gas condensates on the dried sorbent or moistened sorbent injected into the duct to prevent premature corrosion of the air preheater.

9. A method of treating combustion process flue gas to produce cleaned flue gas and reduce system corrosion comprises:
   arranging a combustion boiler equipped with an air preheater for flue gas flow from the boiler through a duct and into the air preheater;
   arranging ductwork for flue gas flow from the air preheater to a dry flue gas desulfurization reactor equipped with a distribution device;

providing a sorbent supply operable to supply sorbent to the distribution device of the dry flue gas desulfurization reactor;

providing a water supply operable to supply water to the distribution device for mixing with the sorbent therein to produce a moistened sorbent for distribution in the dry flue gas desulfurization reactor;

using a particulate removal device operable to remove dried sorbent from flue gas following contact of the flue gas with the moistened sorbent in the reactor to produce cleaned flue gas; and transporting in a duct dried sorbent from the particulate removal device or optionally moistened sorbent from the distribution device for injection of the sorbent into the duct arranged between the boiler and the air preheater for reaction with flue gas $SO_3$ and acid gases.

10. The method of claim 9, wherein the sorbent is calcium oxide, calcium hydroxide or a combination thereof.

11. The method of claim 9, wherein sorbent injected into the duct arranged between the boiler and the air preheater is moistened with water from the water supply.

12. The method of claim 9, wherein the distribution of dried sorbent and/or moistened sorbent to the duct prevents premature corrosion of the air preheater.

13. The method of claim 9, wherein the particulate collection device is a fabric filter module or an electrostatic precipitator.

14. The method of claim 9 wherein the dry flue gas desulfurization system is a NID system, a CDS system or an SDA system.

15. The method of claim 9, wherein the dried sorbent and/or moistened sorbent injected into the duct reacts with $SO_3$ and acid gases in the flue gas flowing therethrough to prevent premature corrosion of the air preheater.

* * * * *